June 2, 1964  F. N. ROTHACKER  3,135,679
APPARATUS FOR MATERIAL TREATMENT
Filed Nov. 8, 1960
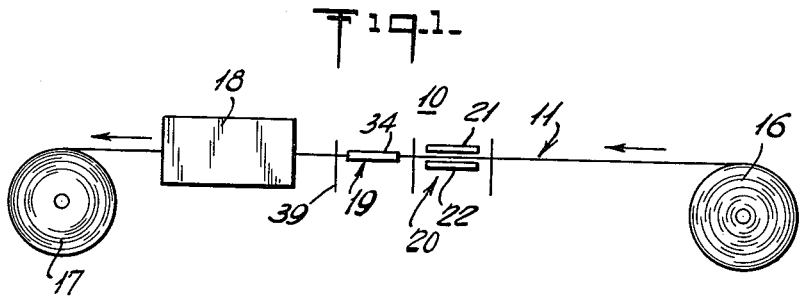
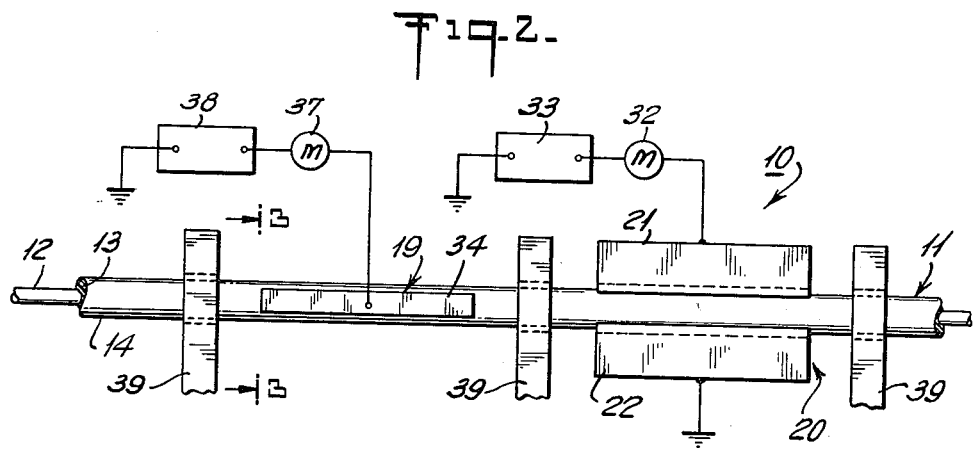
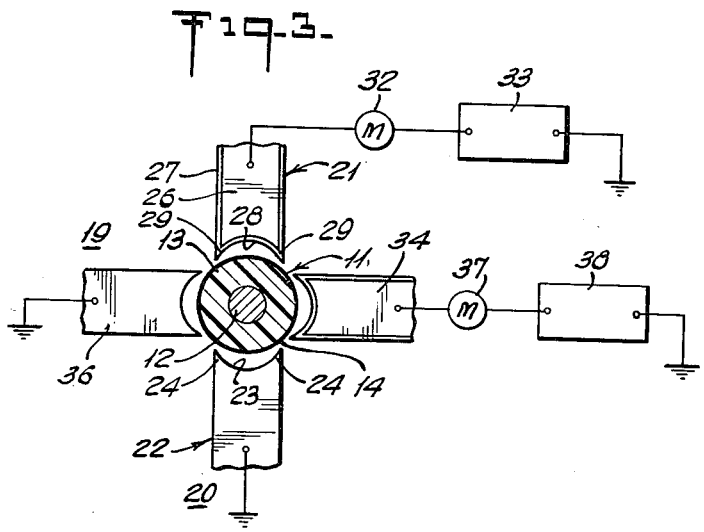
INVENTOR
FRANCIS N. ROTHACKER
BY William R. Lieberman
ATTORNEY United States Patent Office 3,135,679
Patented June 2, 1964

3,135,679
APPARATUS FOR MATERIAL TREATMENT
Francis Neill Rothacker, Orange, N.J., assignor to Sealtron Corporation, Long Island City, N.Y., a corporation of New York
Filed Nov. 8, 1960, Ser. No. 68,072
5 Claims. (Cl. 204—312)

The present invention relates generally to improvements in the treatment of covered or insulated wire, and in particular it relates to an improved method and apparatus for treating the surface of a wire insulating layer formed of a synthetic organic thermoplastic material thereby to improve the adherence and bonding properties to inks, coatings and the like.

The use of synthetic organic thermoplastic materials to coat electrical wire is conventional, and offers many advantages in that it is inexpensive, durable and has superior electrical properties. However, the use for this purpose of many of the more desirable synthetic organic thermoplastic materials, as typified by the polyalkylenes, for example polyethylene, involves an important drawback which frequently decreases the usefulness of the wire. These plastic coatings are very poorly permanently receptive or adherent to inks and similar coatings which are, at best, difficult to apply and which are too easily separated and removed from the wire coating by a minimum of abrasion or similar physical action. As a result, such wire is unsuitable and unacceptable for many applications. While many methods have been proposed for treating coated wire to improve its receptivity and retention of ink, these methods possess numerous drawbacks and disadvantages, and leave much to be desired.

It is, therefore, a principal object of the present invention to provide an improved method and apparatus for the treatment of the surface of synthetic organic thermoplastic thin, elongated, cylindrical articles.

Another object of the present invention is to provide an improved method and apparatus for the treatment of the surface of a synthetic organic thermoplastic-covered wire thereby to improve the adhesiveness and bonding properties of said surface to inks, coatings and the like.

Still another object of the present invention is to provide an improved method and apparatus for the electrical treatment of the surface of a synthetic organic thermoplastic-covered wire to increase the adhesiveness and bonding properties of said surface to conventional inks and coating materials.

A further object of the present invention is to provide an improved method and apparatus of the above nature characterized by simplicity, low cost, high capacity, ease of operation and control, and the effectiveness and high quality of the end product.

The above and other objects of the present invention will become apparent from a reading of the following description taken in conjunction with the accompanying drawing wherein:

FIGURE 1 is a front elevational, partially diagrammatic, view of an apparatus embodying the present invention and which may be employed in practicing the present process;

FIGURE 2 is an enlarged front elevational view of the electrode and guide arrangement of one form of apparatus constructed according to and embodying the present invention, together with the electric power sources; and FIGURE 3 is a sectional view taken along line 3—3 of FIGURE 2.

In a sense, the present invention contemplates the provision of an improved method of treating the surface of an elongated tubular member of a synthetic organic thermoplastic material comprising advancing said tubular member longitudinally along the length thereof and in close proximity to a pair of spaced electrodes, and applying a voltage between said electrodes sufficient to establish an electrical discharge along said surface. The improved apparatus with which the present process may be practiced includes a pair of electrically-separated electrodes having spaced confronting discharge edges located in close proximity to the plastic material surface, and means for applying a voltage between said electrodes sufficient to establish an electric discharge between said electrode edges which travels along and substantially hugs said plastic surface. It has been found at least one of the electrodes should be covered with an insulating or dielectric coating.

The synthetic organic plastic surface treated in accordance with the herein-described and claimed process possesses greatly enhanced properties of adherence to and bonding with conventional inks and coating materials. The coated or printed treated surface completely withstands the "Scotch" brand adhesive tape test in contrast to the same printed or coated untreated surface, wherein the printing or coating is readily removed with "Scotch" brand adhesive tape. The printing or coating may be applied immediately following the treatment of the plastic surface or any time thereafter.

The electric discharge established along the surface of the thermoplastic tube or wire coating may be of the invisible type, a corona discharge, a brush discharge, or any type of electrical discharge. What is meant by and electrical discharge is the electrical phenomenon which is accompanied and evidenced by a sharp and abrupt rise in current between a pair of spaced electrodes, with a small increase in voltage from the non discharge state, wherein the current is negligible. An electric discharge persists at any voltage above the aforesaid minimum voltage. The minimum discharge voltage is dependent upon the electrode configuration, construction and material, the ambient conditions, the electrode spacing, the material being treated and other parameters, and may readily be ascertained by one skilled in the art. A method for determining the minimum discharge voltage includes connecting a sensitive current meter between a variable voltage source and the electrodes and slowly raising the voltage from a very low voltage from below the discharge point until the meter reading rises sharply and abruptly. This voltage represents the minimum effective discharge voltage under the specific operating conditions, and any voltage may be applied above this voltage. It should be noted that for practical reasons voltages and currents which are high enough to produce disruptive arcs should preferably be avoided. It has been found that voltages between about 1,000 volts and 10,000 volts may be advantageously employed.

Examples of materials and coatings which may be treated are the polyalkylenes such as polyethylene, polypropylene and the halogenated or other modified polyalkylenes; polyvinylchloride and other polyvinyl compounds; saran; polyamides such as nylon; polyacrylics; polyesters, such as polyethylene terephthalate, and others.

According to a preferred form of the apparatus of the present invention, there are provided two longitudinally spaced pairs of transversely spaced electrodes extending longitudinally along the tube or wire to be treated. Each of the electrodes is provided with a pair of transversely spaced longitudinally extending edges which confront the corresponding edges of the opposite of the respective pair, the pairs of electrodes being perpendicular to each other. The spacings of the electrode edges are such that the cylindrical surface drawn therethrough is in very close proximity to the electrode edges, the plane extending between opposite edges advantageously lying close to the edge of the plastic work surface and preferably but not necessarily intercepting such work surface. A voltage sufficient to produce a discharge between the electrode edges is applied to each pair of electrodes, the discharge being established between the electrode-confronting edges along and hugging the plastic work surface. The wire or tube is advanced longitudinally to treat the full length thereof. The applied voltage is of any type which will produce an electric discharge and is preferably a fluctuating or alternating current having a frequency between a few cycles per second to in excess of several hundred megacycles per second. As set forth above, at least one of each pair of electrodes is coated with an insulating material of a thickness sufficient to withstand electric discharge piercing and preferably not very much thicker.

Referring now to the drawing which illustrates a preferred embodiment of the present invention, reference numeral 10 generally designates the treating electrode system which is located along the path of the wire 11 which is to be treated, said wire including a central metal conductor 12 and a tubular casing or coating 13 formed of a synthetic organic thermoplastic material, as above set forth, and having an outer work surface 14 which is to be treated. The wire 11 to be treated is withdrawn from a rotatably mounted feed roll 16 and after treatment is wound onto a suitably actuated take-up reel 17. During its passage from feed roll 16 to take-up reel 17, wire 11 is advanced at a predetermined speed in any well known manner, and first passes into registry with the treating electrode system 10, and thereafter through any well known printing, coating or other applicator and drying apparatus 18, which preferably includes a conventional positive wire advancing mechanism of any well-known type.

The treating electrode system includes two pair of electrodes 19 and 20, respectively, which are longitudinally extending and spaced along the path of the wire 11 and are arranged in quadrature relative to each other, and are of generally similar construction. Specifically, the electrode pair 20, includes an upper longitudinally extending electrode 21 and a lower longitudinally extending electrode 22. Lower electrode 22 has an upwardly directed concave face 23 terminating in longitudinally extending parallel sharp discharge edges 24 located directly below and in very close transverse symmetry to the plastic surface 14 and preferably slightly transversely inwardly from the side edges of the surface 14. Upper electrode 21 includes a conducting metal core 26 and a coating 27 of suitable insulating material, as earlier set forth. Said upper electrode 21 has a downwardly directed concave face 28 terminating in longitudinally extending sharp discharge edges 29 which are opposite to discharge edges 24 of lower electrode, and are very close to the work surface 14 and preferably transversely inwardly from the side edges of the work surface 14. It should be noted that although electrode surfaces 23 and 28 are illustrated as deeper than work surface 14 they may have approximately the same curvature. The lower electrode 22 is connected to ground and the upper electrode core member 26 is connected through a current meter 32 to one terminal of an adjustable alternating current high voltage source 33, the other terminal of which is also connected to ground. The high voltage source 33 may comprise a step-up transformer whose input is connected by way of a variable autotransformer to a 60-cycle alternating current power source. Of course, power supply 33 may be of any well known type having an output as previously set forth.

Electrode pair 19 includes electrodes 34 and 36 identical to the electrodes 21 and 22 respectively but longitudinally spaced from the electrode pair 20, and arranged in quadrature relative thereto in that the confronting faces thereof are located on opposite sides of the work surface 14 and are transversely directed. The disposition of the longitudinally extending sharp discharge edges of electrodes 34 and 36 relative to work surface 14 is similar to that of the discharge edges 24 and 29, except that they are shifted 90° about the wire path. The core of electrode 34 is connected by way of a meter 37 to one terminal of an alternating voltage source 38, similar to the source 33, the other terminal thereof being connected to ground, and electrode 36 is likewise connected to ground.

In order to insure that wire 11 continuously traverses the desired path relative to the electrode pairs 19 and 20 there are provided a plurality of wire guides 39 between the electrode pairs 19, 20 and opposite sides thereof. The wire guides are apertured in the usual manner and are vertically and transversely adjustable. Furthermore, electrodes 21 and 22 are suitably mounted in any well known manner, so that each is vertically and transversely adjustable as are the electrodes 34 and 36.

In operation, the voltage sources 33 and 38 are adjusted until the voltage is at least high enough that an electrical discharge is established between the electrodes 21 and 22 and between the electrodes 34 and 36 as indicated by a sharp rise in the reading of the meters 32 and 37 respectively.

Electrical discharges are thus established between the discharge edges 24 and 28, these electrical discharges extending along and hugging the side quarters of the work surface 14 for the length of the discharge edges 28 and 24 thereby treating the area of surface 14 delineated by such discharge edges. Electrical discharges are likewise established between the discharge edges of electrodes 34 and 36 thereby to treat the upper and lower quarters of the surface 14. Therefore, as the wire 11 is advanced the complete surface thereof along its full length is exposed to the electric discharge and thus treated.

As an example of the practice of the present process, employing the apparatus above described, each of the electrode pairs 19, 20 extended six inches along the path of the wire to be treated. The wire treated was a No. 20 copper wire having a polyethylene coating with an outer diameter of 1/8". The discharge edges of the electrodes were spaced approximately 25 mils from the coated surface 14 and the distance between the discharge edges of each electrode was slightly less than 1/8" and the distance between opposing discharge edges of opposite electrodes was slightly less than 1/8". The length of the discharge edges was 6". A 60 cycle per second alternating current at 6,500 volts was applied to each pair of electrodes by way of the respective voltage sources. The wire 11 was advanced at a rate of 1' per second. A visible corona discharge was observed between the electrode edges along the intervening surface 14 of the coating 13, and also to some extent at that portion of the surface 14 which margined the confronting faces of the electrodes. It should be noted that the intensity of the present treatment is dependent on the time of exposure to the electrical discharge which in turn is a function of the electrode length and speed of advance of the wire, as well as on the electrode spacing relative to the work surface and to each other, the voltage, its frequency and the amount of current. The length of the electrodes may be diminished or increased to 2' or more and the voltage is preferably between 1,000 and 10,000 volts. The distance between the electrode discharge edges may likewise be varied from a point where they touch the surface 14 to any distance so long as an electric discharge is established which hugs the surface 14. The parameters may thus be widely varied provided the above type and disposition of electric discharge is established as earlier set forth.

The surface 14 treated in the above example when coated or printed with conventional inks completely and repeatedly withstood the "Scotch" brand adhesive tape test, whereas when the untreated surface was coated or printed in a like manner, the coating or printing was readily removed by the "Scotch" brand adhesive tape. One ink that was used in the above tests was Bensen Brothers and Deeny R400 ink.

While there has been described and illustrated preferred embodiments of the present invention it is apparent that numerous alterations, omissions and additions may be made without departing from the spirit thereof.

What is claimed and desired to be claimed is:

1. An apparatus for the treatment of the surface of a plastic coated wire to improve the adherent properties thereof comprising means advancing said wire along a predetermined linear path, a pair of spaced mutually insulated electrodes having elongated sharp confronting discharge edges disposed along and in close proximity to a common face of said plastic surface with at least one of said edges being covered with an insulating material, and means applying a voltage between said electrodes sufficient to establish an electric discharge between said sharp edges which travels along and substantially hugs said plastic surface.

2. An apparatus according to claim 1, wherein said sharp discharge edges extend substantially parallel to the path of said wire.

3. An apparatus according to claim 2, including means for maintaining said plastic surface and said electrodes in approximately a common plane.

4. An apparatus according to claim 1, wherein each of said electrodes includes a pair of transversely spaced elongated sharp edges substantially parallel to the path of said wire and directed along opposite faces of said plastic surface.

5. An apparatus according to claim 1, wherein said voltage is alternating.

References Cited in the file of this patent

UNITED STATES PATENTS

| | | |
|---|---|---|
| 2,397,615 | Mittelmann | Apr. 2, 1946 |
| 2,484,076 | Collins | Oct. 11, 1949 |
| 2,810,933 | Pierce | Oct. 29, 1957 |
| 2,923,964 | Plonsky | Feb. 9, 1960 |
| 2,969,463 | McDonald | Jan. 24, 1961 |

FOREIGN PATENTS

| | | |
|---|---|---|
| 599,193 | Great Britain | Mar. 8, 1948 |
| 787,403 | Great Britain | Dec. 11, 1957 |